United States Patent
Allgaier et al.

(10) Patent No.: US 10,845,237 B2
(45) Date of Patent: Nov. 24, 2020

(54) STRUCTURAL IMPLEMENTATIONS FOR OPTIMIZING ACOUSTIC RESONANCE IN A VIBRATION SENSOR

(71) Applicant: VEGA GRIESHABER KG, Wolfach (DE)

(72) Inventors: Volker Allgaier, Haslach i.K. (DE); Dominik Fehrenbach, Haslach (DE)

(73) Assignee: VEGA Grieshaber KG, Wolfach (DE)

( * ) Notice: Subject to any disclaimer, the term of this patent is extended or adjusted under 35 U.S.C. 154(b) by 217 days.

(21) Appl. No.: 15/628,736

(22) Filed: Jun. 21, 2017

(65) Prior Publication Data

US 2018/0017433 A1    Jan. 18, 2018

(30) Foreign Application Priority Data

Jul. 18, 2016 (EP) .................................. 16179986

(51) Int. Cl.

| | |
|---|---|
| *G01H 3/04* | (2006.01) |
| *G01H 3/00* | (2006.01) |
| *G01F 23/296* | (2006.01) |
| *G10K 11/00* | (2006.01) |
| *G01H 11/06* | (2006.01) |
| *G10K 11/24* | (2006.01) |
| *G10K 9/22* | (2006.01) |
| *B06B 1/02* | (2006.01) |
| *G01H 17/00* | (2006.01) |

(52) U.S. Cl.
CPC ............. *G01H 3/04* (2013.01); *G01F 23/296* (2013.01); *G01H 3/00* (2013.01); *G01H 11/06* (2013.01); *G10K 11/002* (2013.01); *G10K 11/24* (2013.01); *B06B 1/02* (2013.01); *G01H 17/00* (2013.01); *G10K 9/22* (2013.01)

(58) Field of Classification Search
CPC . G01H 3/04; G01H 3/00; G01H 11/06; G01H 17/00; G01F 23/296; G10K 11/002; G10K 11/24; G10K 9/22; B06B 1/02
USPC ...................................................... 73/504–160
See application file for complete search history.

(56) References Cited

U.S. PATENT DOCUMENTS

| | | | | |
|---|---|---|---|---|
| 4,817,165 | A * | 3/1989 | Amalaha | H04R 7/122 181/170 |
| 6,282,298 | B1 * | 8/2001 | Azima | G07F 9/02 381/423 |
| 2006/0021430 | A1 * | 2/2006 | Ohmayer | G01F 23/2966 73/290 V |
| 2006/0117851 | A1 * | 6/2006 | Ohuchi | G01C 19/5614 73/504.16 |

(Continued)

FOREIGN PATENT DOCUMENTS

| | | |
|---|---|---|
| DE | 42 03 715 A1 | 8/1993 |
| DE | 10 2014 115589 A1 | 4/2016 |

(Continued)

OTHER PUBLICATIONS

Translate DE-102014115589-A1 (Year: 2016).*

*Primary Examiner* — Peter J Macchiarolo
*Assistant Examiner* — Monica S Young
(74) *Attorney, Agent, or Firm* — William Gray Mitchell

(57) ABSTRACT

A vibration sensor, with a diaphragm that can be excited via a drive to vibrate, and a mechanical vibrator arranged at said diaphragm, with the mechanical vibrator comprising a cover with at least one closed interior chamber.

7 Claims, 3 Drawing Sheets

(56) References Cited

U.S. PATENT DOCUMENTS

| | | | | |
|---|---|---|---|---|
| 2012/0152454 A1* | 6/2012 | Mass | ........................ | H01P 3/121 |
| | | | | 156/280 |
| 2013/0228392 A1* | 9/2013 | Iwata | ........................ | H04R 1/28 |
| | | | | 181/148 |
| 2015/0137899 A1* | 5/2015 | Yamada | .................... | H03H 3/04 |
| | | | | 331/156 |
| 2016/0069730 A1* | 3/2016 | Gruhler | ............... | G01F 23/2968 |
| | | | | 73/290 V |
| 2016/0117015 A1* | 4/2016 | Veneri | .................... | G01H 11/06 |
| | | | | 345/174 |
| 2016/0308510 A1* | 10/2016 | Ishino | .................... | H03H 9/215 |
| 2017/0297673 A1* | 10/2017 | Rice | ........................ | C23C 30/00 |
| 2019/0165761 A1* | 5/2019 | Oga | ........................ | H03H 9/215 |

FOREIGN PATENT DOCUMENTS

| | | | | |
|---|---|---|---|---|
| DE | 102014115589 A1 * | 4/2016 | .......... | G10K 11/002 |
| EP | 2 148 322 A2 | 1/2010 | | |

\* cited by examiner

STRUCTURAL IMPLEMENTATIONS FOR OPTIMIZING ACOUSTIC RESONANCE IN A VIBRATION SENSOR

CROSS REFERENCE TO RELATED APPLICATIONS

This patent application claims priority to European Patent Application 16179986.1, filed on Jul. 18, 2016.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a vibration sensor and method for producing a vibration sensor.

Background of the Invention

The present invention relates to a vibration sensor according to the preamble of patent claim 1, as well as a method for producing a vibration sensor according to patent claim 9.

In prior art, vibration sensors, which are used, for example, as vibration level switches, are popular, with the vibration sensor comprising a diaphragm that can be excited by a drive to vibrate, and this way the mechanical vibrator, arranged at the diaphragm, can be excited to a vibration. Depending on a cover layer of the mechanical vibrator with filling material, as well as depending on the viscosity and the density of this filling material, the vibrator oscillates with a characteristic frequency, which can be detected by a vibration sensor and can be converted into a measuring signal.

The mechanical vibrators of such vibration sensors are, for example, produced by metal injection molding (MIM), casting, or vacuum casting, and show, according to prior art, a solid, i.e. completely filled, shape in the area of the mechanical vibrator.

Depending on the mass and design of the mechanical vibrator, the vibrator shows a characteristic oscillating behavior in the air as well as in respective measuring media, with regards to frequency and/or amplitude and with regards to decay behavior after excitation. In general, for determining the measuring signal, a frequency change is determined between the vibration frequency in the air, the so-called air frequency, and the vibration frequency when immersed in the measuring medium, the so-called medium frequency.

It is considered disadvantageous, in vibration sensors popular from prior art, that the frequency change between the air frequency and the medium frequency sometimes shows insufficient distinction in order to exclude false detections, which are due to pressure-induced and/or temperature-induced frequency fluctuations.

The objective of the present invention is to optimize a frequency change between the air frequency and the medium frequency, i.e. to design it as large as possible.

This objective is attained in a vibration sensor showing the features of patent claim 1. A vibration sensor according to the invention can be produced by the method for generating a vibration sensor according to claim 9.

BRIEF SUMMARY OF THE INVENTION

In a preferred embodiment, a vibration sensor (1), with a diaphragm (5) that can be excited to vibrate via a drive (3) and a mechanical vibrator (7) arranged at the diaphragm (5), characterized in that the mechanical vibrator (7) comprises a cover (9) with at least one closed interior chamber (11).

In another preferred embodiment, the vibration sensor as described herein, characterized in that in the interior chamber (11) a filler (13) is arranged.

In another preferred embodiment, the vibration sensor as described herein, characterized in that the filler (13) comprises reduced density compared to the cover (9).

In another preferred embodiment, the vibration sensor as described herein, characterized in that the filler (13) is arranged as a support structure (13) with a plurality of hollow chambers (15) arranged between the ridges (17).

In another preferred embodiment, the vibration sensor as described herein, characterized in that the support structure (13) is designed regularly.

In another preferred embodiment, the vibration sensor as described herein, characterized in that the support structure (13) is designed with a honey-comb like cross-section.

In another preferred embodiment, the vibration sensor as described herein, characterized in that the support structure (13) comprises hollow chambers showing a round cross-section.

In another preferred embodiment, the vibration sensor as described herein, characterized in that the interior chamber (11) is filled with foamed material, preferably a metal foam.

In another preferred embodiment, the vibration sensor as described herein, characterized in that the cover (9) and/or the support structure (13) show a wall thickness from 50 μm to 500 μm, preferably 100 μm to 400 μm, further preferably showing 300 μm.

In another preferred embodiment, the vibration sensor as described herein, with at least one cover (9) of the mechanical vibrator (7) being designed with at least one closed interior chamber (9) using a generative production method.

In another preferred embodiment, the vibration sensor as described herein, characterized in that the generative production method is a 3-D printing method.

In another preferred embodiment, the vibration sensor as described herein, characterized in that the interior chamber (13) is filled with a metal foam.

In another preferred embodiment, the vibration sensor as described herein, characterized in that a metal foam is coated with a cover (9) using a 3-D printing method.

In another preferred embodiment, the vibration sensor as described herein, characterized in that the cover (9) as well as a support structure (13) arranged inside the cover (9) are printed jointly.

In another preferred embodiment, the vibration sensor as described herein, characterized in that the cover (9) and the support structure (13) are printed with a 3-D serigraphy method.

DETAILED DESCRIPTION OF THE INVENTION

Figure 1:
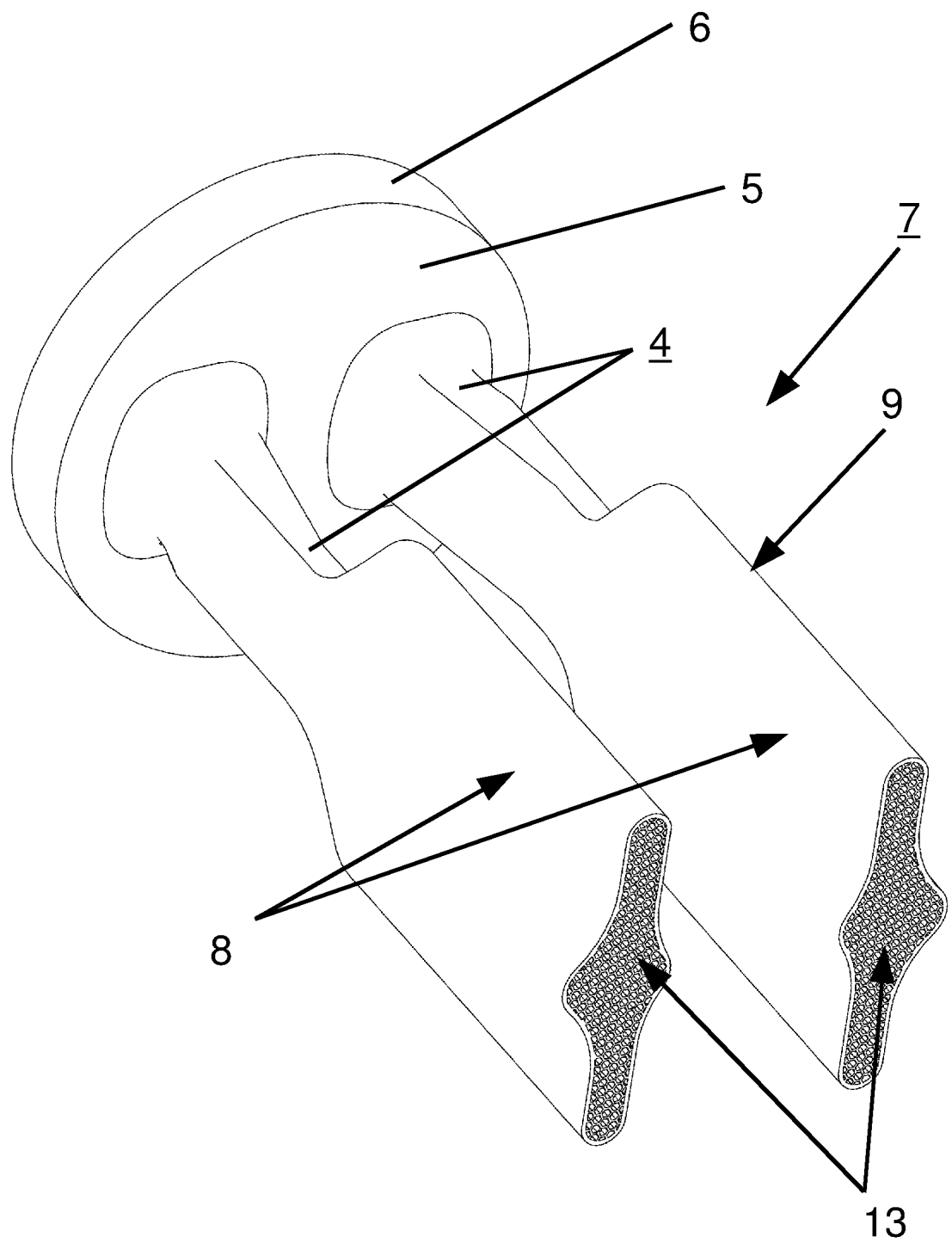
FIG. 1 is a line drawing evidencing a perspective view of a mechanical vibrator according to the present application.

The invention comprises an inventive vibration sensor, with a diaphragm that can be excited via a drive to oscillate and a mechanical vibrator arranged at the diaphragm, is characterized in that the mechanical vibrator comprises a cover with at least one closed interior chamber. In a basic design, the mechanical vibrator, according to the present invention, is therefore designed in a hollow fashion. This leads to reduced weight compared to solid vibrators, i.e. mechanical ones that are designed with filling material, and thus to increased air frequency of the mechanical vibrator as well as a higher frequency change upon covering the mechanical vibrator with a measuring medium. Due to a greater frequency change, false detections are prevented, such that overall improved measuring results can be achieved.

In order to further reduce the wall thickness of the mechanical vibrator but still being able to achieve high stability of the mechanical vibrator, in a further development of the invention, a filler is arranged inside the interior chamber, particularly a filler with a density lower than that of the cover.

By arranging a filler inside the mechanical vibrator, damages caused by mechanical loads can be prevented, as well as preventing the cover being pierced or deformed, for example.

The filler can be arranged for stabilizing the mechanical vibrator, for example as a support structure with a plurality of hollow chambers arranged between the ridges. By an appropriate support structure, for example a regularly designed structure, which may be designed in a cross-section e.g. like honey-comb, a considerable increase of stability and rigidity of the mechanical vibrator is achieved, so that any vibrations introduced via the diaphragm can be transferred reliably to the mechanical vibrator.

As an alternative to a regularly designed structure, the interior chamber can also be filled with a foamed material, preferably a metal foam. Foamed materials, particularly metal foams, also show high rigidity and simultaneously low weight.

The cover and/or support structure preferably comprise a wall thickness between 50 μm and 500 μm, preferably between 100 μm and 400 μm, further preferably 300 μm.

A method for producing a mechanical vibrator of a vibration sensor according to the present invention is characterized in that at least one cover of the mechanical vibrator is designed with at least one closed interior chamber and produced by a generative production method. Compared to the popular production method of prior art, a hollow structure can be produced in a particularly simple fashion by a generative production method, for example a 3-D printing method. The cover can be frothed, for example, with a metal foam or a metal foam structure can be coated with a cover using a 3-D printing method.

Alternatively, the cover, as well as the support structure arranged in the cover, can be printed jointly in a 3-D printing method, with a 3-D serigraphy method being particularly suited for generating hollow structures, because in a 3-D serigraphy method no residue remains inside the cavities of the powder material typically used in 3-D printing methods.

DETAILED DESCRIPTION OF THE FIGURES

FIG. 1 shows a mechanical vibrator 7 of a vibration sensor 1, which is essentially designed as a tuning fork arranged at a diaphragm 5. The mechanical vibrator 7 comprises, in the present exemplary design, two paddles 8, arranged parallel to each other, which are arranged respectively via an adapter 4 at the diaphragm 5 and are connected thereto.

Figure 2:
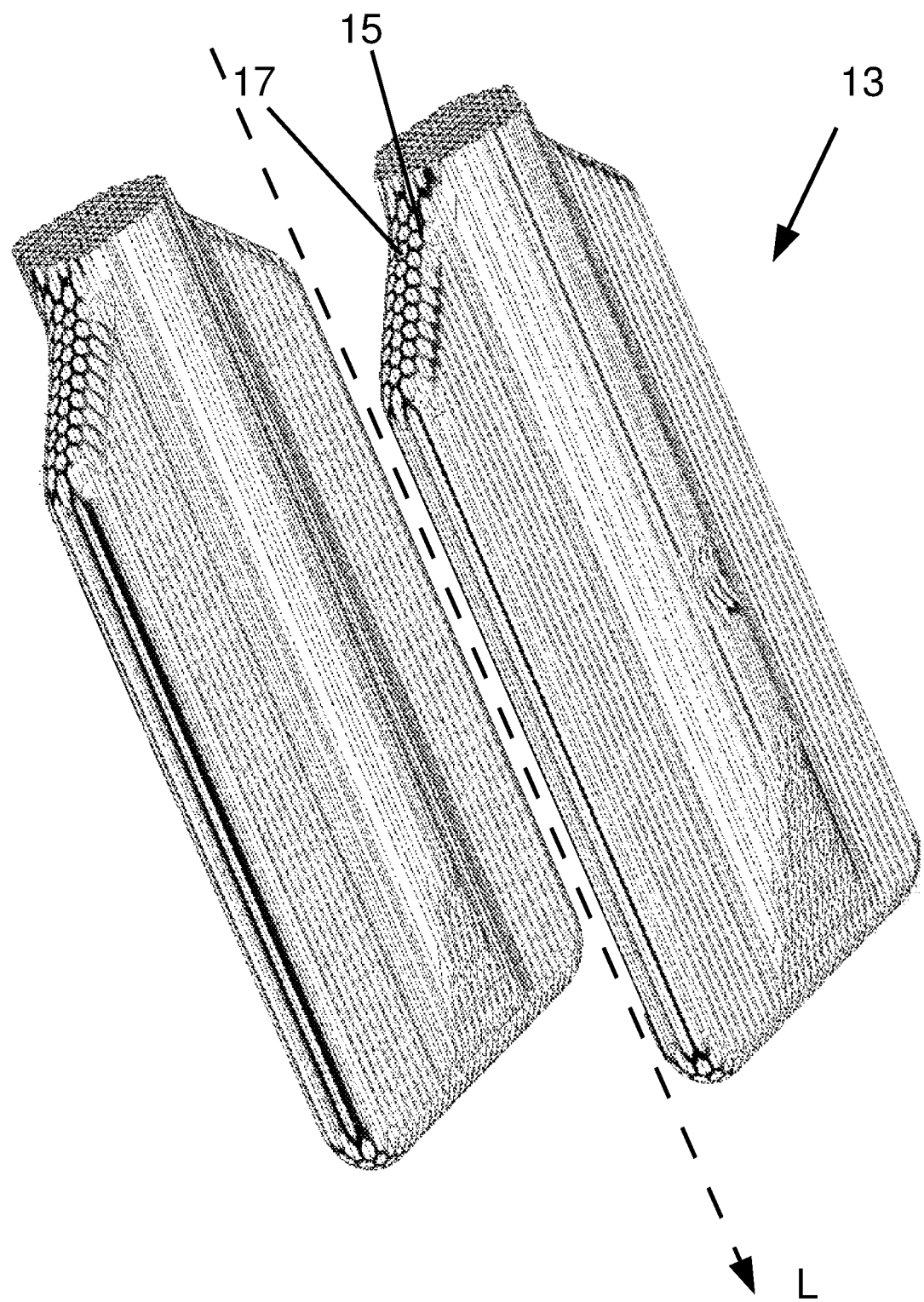
FIG. 2 is a line drawing evidencing the support structure of the mechanical vibrator of FIG. 1 in a perspective view.

In the present exemplary design, the paddles 8 are designed with a cover 9 as well as an interior chamber 11 filled with a filler 13, designed as a support structure. By arranging the support structure 13 in the cover 9, the reduction of the stability of the mechanical vibrator 7 is minimized, with the weight simultaneously being reduced compared to a solidly built variant. The exemplary design of the filler 13 as well as its design as a support structure is particularly clearly discernible from FIG. 2. In this illustration it is particularly distinct that the filler 13 is provided with a plurality of cavities 15 extending in the longitudinal direction of the paddles 8, which are limited by braces 17.

Figure 3:
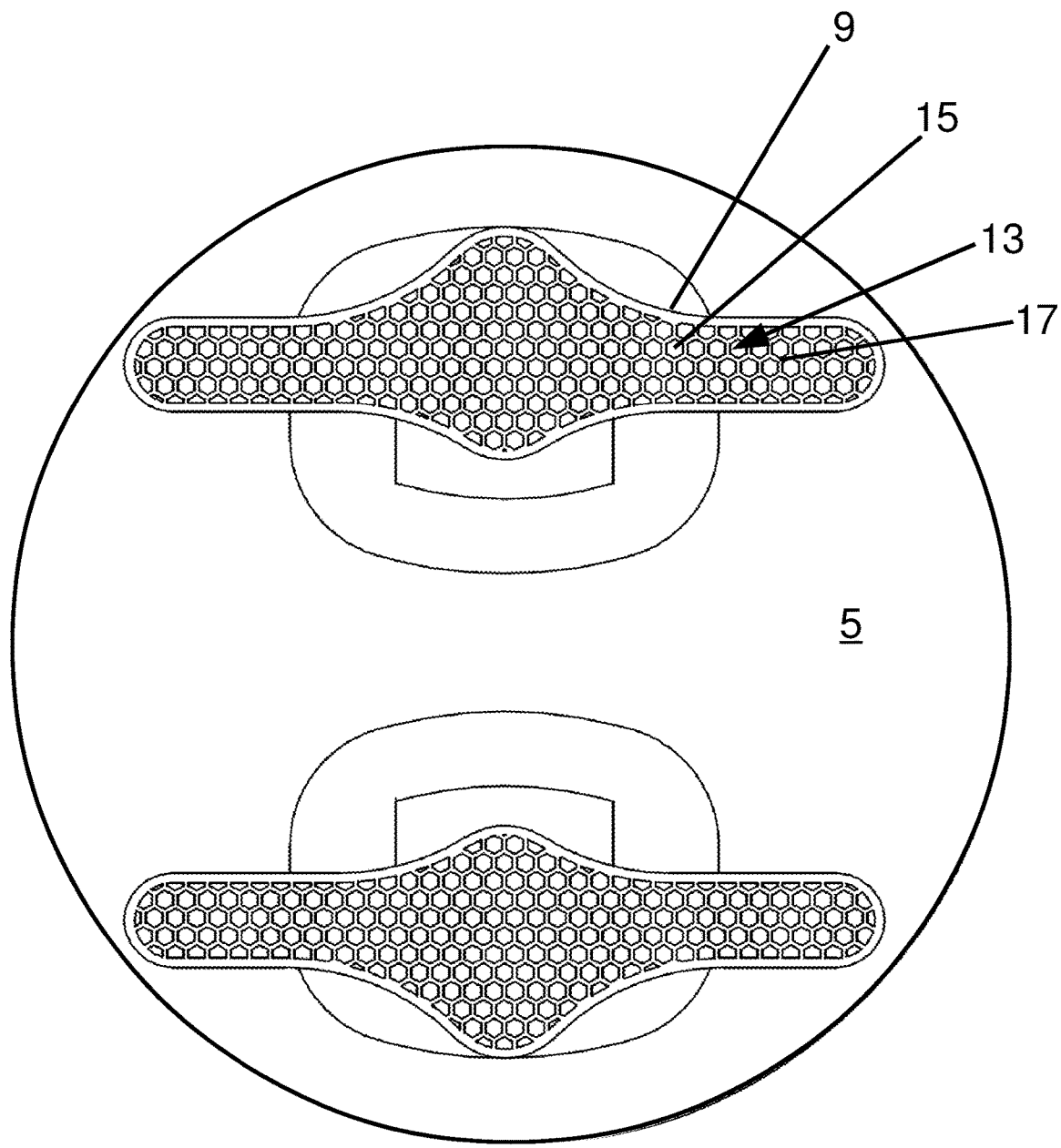
FIG. 3 is a line drawing evidencing a cross-section through the mechanical vibrator of FIG. 1.

The erection of the support structure 13, as well as its arrangement inside the cover 9, is particularly clearly discernible in the cross-section through the paddles 8 shown in FIG. 3. Within the cover 9, which, in the present exemplary design, shows a thickness of _300_μm, a honey-comb shaped support structure 13 is arranged. The support structure 13 is formed essentially by ridges 17 limiting the cavities 15, defining hexagonal capillaries extending in the longitudinal direction L. Such a structure ensures a torsion-proof and stable structure of the paddles 8, simultaneously considerably reducing their weight. In the present exemplary design, the ridges 17 show a wall thickness of approx. 50_μm.

By reducing the weight of the mechanical vibrator 7, the vibrator also shows a higher resonance frequency in the air as well as a higher frequency change upon immersion in a fill medium compared to solidly designed mechanical vibrators, so that, in this way, a considerably improved measuring behavior can be achieved. This way, improved signal deviation or, in other words, improved signal-noise difference is achieved.

The mechanical vibrator 7, according to the present invention, is preferably produced with a generative production method, particularly with a 3-D printing method, particularly 3-D serigraphy. By such a 3-D printing method, the cover 9 and the support structure 13 can be produced jointly.

In 3-D serigraphy, gaps of more than 1 mm can be bridged.

Further, cavities can be produced via appropriate drilling techniques. Drills can nowadays show very small diameters, as small as 0.1 mm. Limitations are given here only because in the case of long drilled holes, the drill bits can break or absolutely straight bore holes are no longer possible. After such a drilling process, the upper side can be closed again via welding.

LIST OF REFERENCE NUMBERS

1 Vibration sensor
3 Drive
5 Diaphragm
6 Collar

7 Mechanical vibrator
8 Paddle
9 Cover
11 Interior chamber
13 Filler/support structure
15 Hollow chambers
17 Ridges
L Longitudinal direction
1 Vibration sensor
3 Drive
5 Diaphragm
6 Collar The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A vibration sensor comprising a diaphragm that can be excited to vibrate via a drive and a mechanical vibrator arranged at the diaphragm, wherein the mechanical vibrator comprises one or more paddles, wherein each such paddle comprises a cover, a closed interior chamber and a filler located within such closed interior chamber, such filler being arranged as a support structure comprising a plurality of ridges and hollow chambers between such ridges, wherein the cover and supporting structure propagates a vibrating frequency.

2. The vibration sensor, according to claim 1, wherein the filler comprises reduced density compared to the cover.

3. The vibration sensor, according to claim 1, wherein the support structure is designed in a repeating geometric pattern.

4. The vibration sensor, according to claim 1, wherein the support structure is designed with a honey-comb like cross-section.

5. The vibration sensor, according to claim 1, wherein the support structure comprises hollow chambers showing a round cross-section.

6. The vibration sensor, according to claim 1, wherein the interior chamber is filled with a metal foam.

7. The vibration sensor, according to claim 1, wherein the cover and/or the support structure show a wall thickness from 50 μm to 500 μm.

* * * * *